United States Patent

[11] 3,550,789

[72] Inventors Benjamin E. Jaeger
Plano, Ill.;
Charles T. Moore, Brockport, Pa.
[21] Appl. No. 714,572
[22] Filed Mar. 20, 1968
[45] Patented Dec. 29, 1970
[73] Assignee Brockway Glass Company, Inc.
Brockway, Pa.

[54] ARTICLE TRANSFER APPARATUS
5 Claims, 8 Drawing Figs.

[52] U.S. Cl. ................................................ 214/1,
198/31
[51] Int. Cl. .................................................... B65g 47/52
[50] Field of Search ............................................ 214/1B3;
198/210, 31A1

[56] References Cited
UNITED STATES PATENTS

| | | | |
|---|---|---|---|
| 3,373,880 | 3/1968 | Dubesset ...................... | 214/1(B3) |
| 3,043,447 | 7/1962 | Lauck .......................... | 198/210X |
| 3,175,702 | 3/1965 | Banyas ........................ | 198/210X |

FOREIGN PATENTS

| | | | |
|---|---|---|---|
| 955,715 | 4/1964 | Great Britain................ | 214/1(B3) |

*Primary Examiner*—Gerald M. Forlenza
*Assistant Examiner*—George F. Abraham
*Attorney*—Christel & Bean

ABSTRACT: Apparatus for transferring rows of bottles from a single row relatively fast moving conveyor to a wide slower moving conveyor. A pair of elongated gripping bars simultaneously grip the tops of a row of bottles from the fast moving conveyor and then swing arcuately on parallel arms to the slow moving conveyor and release the bottles to form a rank of bottles thereon. The bars are caused to swing tangent to the row of bottles to be picked up and at the point of tangency the speed of the bars is synchronized with the speed of the feed conveyor so that the bottles are gripped by the bars without substantial change of speed or direction. In swinging to the discharge point on the slow moving conveyor the gripping bars are slowed to the speed thereof so that upon release the bottles are not abruptly speeded up or slowed down and are deposited securely upon the discharge conveyor.

INVENTORS
BENJAMIN E. JAEGER
CHARLES T. MOORE
BY
Christel & Bean
ATTORNEYS

ARTICLE TRANSFER APPARATUS

BACKGROUND OF THE INVENTION

The present invention relates to article handling apparatus and particularly to apparatus for automatically transferring articles such as glass bottles from one moving conveyor to another in successive cycles or for like purposes.

Where a large number of articles, such as glass bottles, move along a conveyor from one step in the manufacturing process to another it is frequently necessary to transfer the articles to another conveyor moving at a different speed and in a different direction from the first conveyor, and sometimes at a different elevation. Various expedients are employed for effecting this transfer, such as by hand, by means of chutes, deflecting plates and the like. Mechanized transfer devices have also been resorted to but the problem of picking up moving bottles from one conveyor and depositing them upon another conveyor has rendered these prior art mechanized transfer devices uncertain in operation and generally unsatisfactory.

The problem of transferring articles such as bottles is particularly troublesome where the bottles move to the transfer point at one speed and must be transferred to a surface moving at a much different speed or not at all. Bottles, particularly moderately tall bottles, are quite unstable, and this further complicates the problem of transferring them without having the bottles fall over or become otherwise disarranged, with consequent disruption in the ordinary flow of bottles and the likelihood of breakage of the bottles or other damage.

A typical instance which illustrates the problems encountered in transferring bottles is in a case where the bottles are carried along a narrow conveyor in a single row, as from a bottle forming machine, and must be transferred to a wide conveyor belt, such as a lehr belt, it being necessary to arrange the bottles on the lehr belt with a considerable number of bottles in each rank. Obviously the lehr belt will move at only a small fraction of the lineal speed of the single row conveyor which brings the bottles to the transfer point. By way of example, the apparatus of the present invention will be discussed and described in connection with and as applied to this later problem.

SUMMARY OF THE INVENTION

In the apparatus of the present invention a bottle gripping mechanism is mounted to swing to and fro in an arcuate path to pick up one or more bottles, move the bottles to a discharge point, release them, and return for a successive pickup operation. The arcuate movement of the bottle gripping mechanism is arranged so that the mechanism moves tangent to the line of travel of bottles to be picked up, and, furthermore, the speed of movement of the mechanism as it passes the point of tangency to the direction of bottle travel is substantially equal to the speed of the conveyor. Accordingly, the bottle is gripped by the mechanism without any abrupt or even substantial change in its direction or speed of movement.

As the mechanism moves from this pickup point to the discharge point its speed is varied to substantially match the speed of the conveyor upon which the bottle is to be deposited. The arcuate travel of them the mechanism also changes its direction of movement. In the instance referred to above wherein a single row of bottles moves to the transfer mechanism a plurality of bottles from such row is picked up and deposited upon the slower moving and wider discharge conveyor on which it forms a rank of bottles.

If, for instance, 12 bottles were picked up simultaneously from the feed conveyor to form a single rank of 12 bottles on the discharge conveyor, the speed of the discharge conveyor would be roughly one-twelfth the speed of the feed conveyor. Therefore, the speed and direction of the bottles at the discharge point is not as critical as at the pickup point, in the foregoing example. Nevertheless, the arcuate movement of the gripping mechanism is retarded at the discharge point so that the component of bottle movement in the direction of the discharge conveyor is substantially synchronized with the speed of the discharge conveyor.

It is to be understood that the reverse of the foregoing operation may be provided for with apparatus according to the present invention wherein a rank of bottles is lifted from a conveyor and deposited upon a faster moving conveyor in such manner as to form a single fast moving row of bottles thereon. This arrangement may be employed at the discharge end of a lehr. Many other modifications and adaptations of the principles of the present invention may be made and will occur to those skilled in the art to which the invention pertains form a study of the embodiment illustrated in the drawings and described in the following description of a preferred embodiment. However, it is to be understood that the invention is not limited to such embodiment nor otherwise than as defined in the appended claims.

DESCRIPTION OF THE PREFERRED EMBODIMENT

Figure 1:
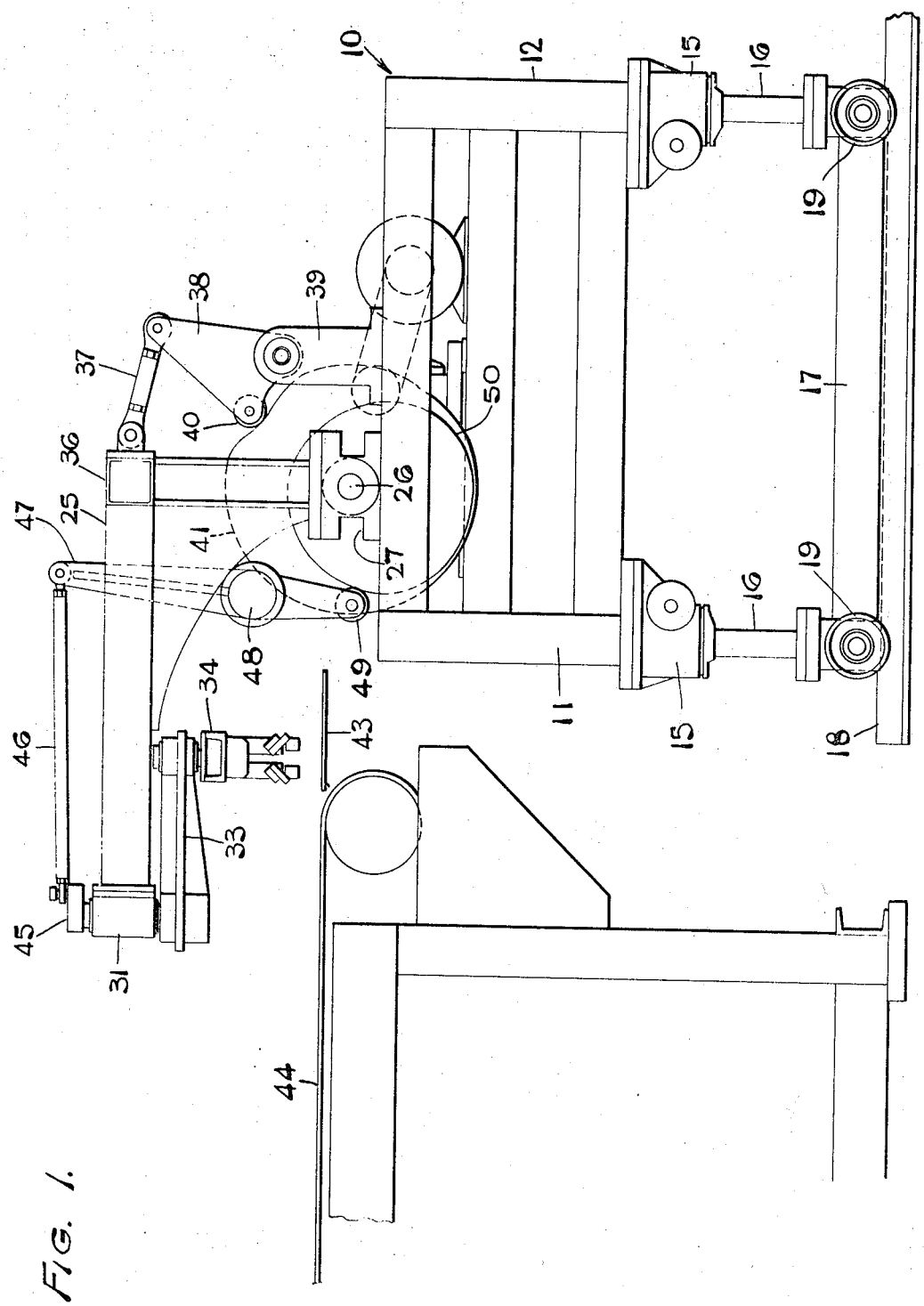
FIG. 1 is a general side elevational view of one form of the apparatus of the present invention.

In the drawings like characters of reference denote like parts and the supporting framework designated generally by the reference numeral 10 includes four vertical angle irons 11 through 14 whose lower ends are fixed to gear boxes 15 which are vertically adjustable upon four corner posts 16 which extend upwardly from a horizontal lower framework 17 which is supported for rolling movement on tracks 18 by wheels 19. The upper ends of posts 16 are threaded and the internal construction of gear boxes 15 is like a screw jack. The nut elements of the screw jacks in boxes 15 are synchronously rotated by means of connecting shafts 20. Thus the effective height of the machine may be readily adjusted.

The bottle lifting and transferring mechanism is supported by a pair of L-shaped brackets 25 which are pivotally mounted on a shaft 26 which is journaled in bearings 27 carried by crossmembers 28 of the upper portion of the framework 10. Shaft 26 also serves as a general camshaft for operating the article transfer mechanism of the apparatus and comprises the output shaft of a variable ratio speed reducer unit 29 which is belt connected to an electric drive motor 30 as at 35 in FIG. 3. By reason of the pivotal mounting of brackets 25 their outer ends, the left-hand ends as viewed in FIG. 1, are movable upwardly and downwardly by such pivotal movement.

The outer ends of brackets 25 include vertically disposed bearings 31 which support pivot shafts 32 and rock arms 33 are fixed to the lower ends of pivot shafts 32.

A hollow beam member 34 which extends parallel to the main shaft 26 of the machine is pivotally supported at the outer end of the rock arms 33 as appears from FIG. 1. Beam 34 supports a bottle pickup mechanism for simultaneously picking up and subsequently depositing a row of bottles or similar articles and this mechanism will be described more fully later herein.

Figure 2:
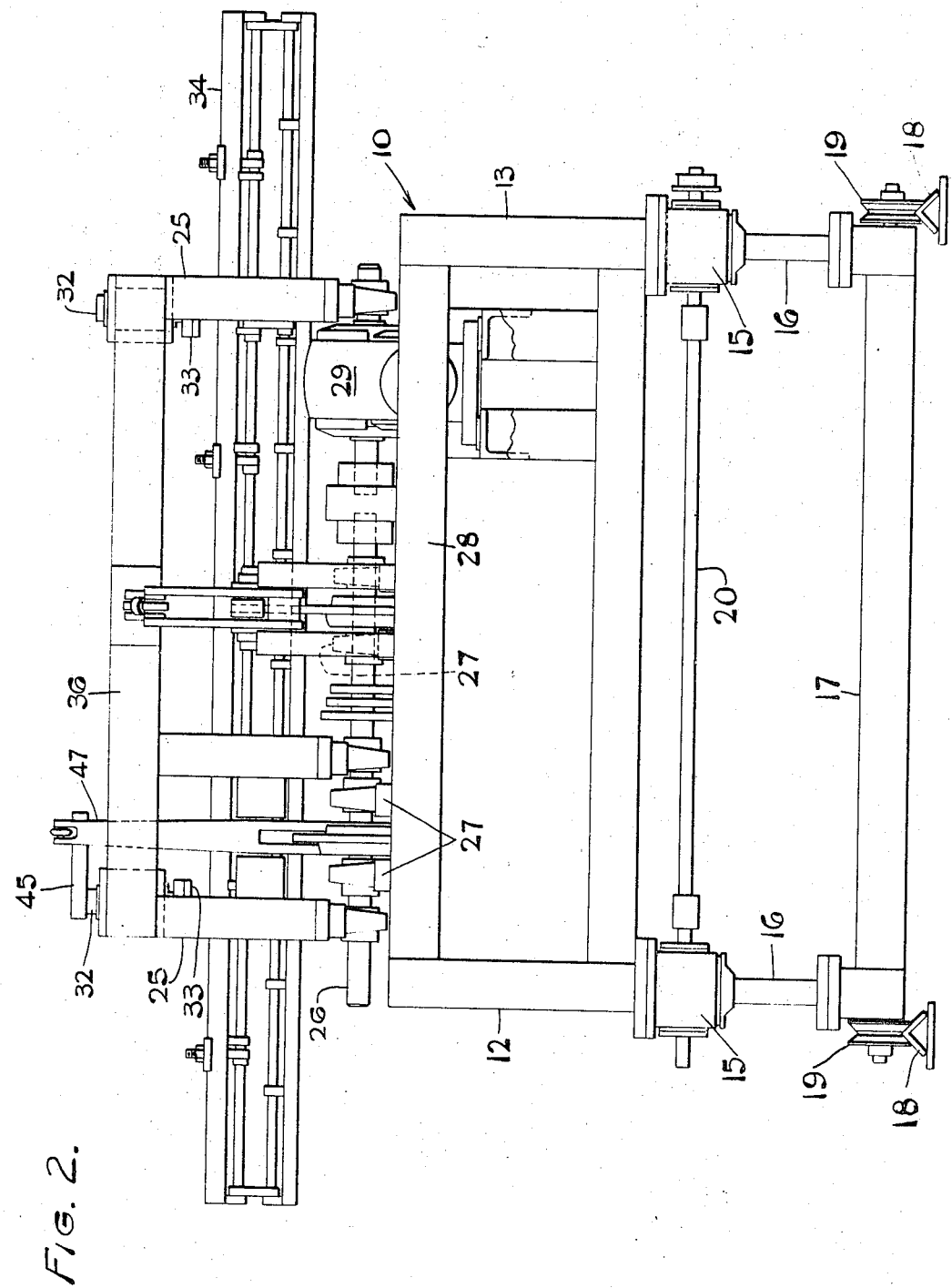
FIG. 2 is an end elevational view thereof viewed from the right-hand side of FIG. 1.

The apex portions of the L-shaped brackets 25 are rigidly connected by a crossbeam dies designated 36 in FIGS. 1 and 2 and a link 37 which is pivoted at one end o to the midpoint of beam 36 imparts rocking movement to L-shaped brackets 25. A rocker member 38 is pivoted to the opposite end of link 37 and is mounted for pivotal movement on a bracket 39 carried by frame 10. Rocker 38 includes a cam follower 40 which engages a cam 41 which rotates with shaft 26. The rocking movement of brackets 25 produced by cam 41 raises and lowers beam 34 of the bottle lifting and lowering mechanism in synchronism with transfer movements thereof which will now be described.

The arms 33 swing beam 34 and its associated bottle lifting and lowering mechanism in a generally horizontal plane from a pickup position to a position where the bottles are released. In FIG. 1 the arms 33 and beam 34 are shown generally in the position in which bottles are picked up from a conveyor 43 for movement to a second belt conveyor 44 which may comprise a lehr belt or other relatively wide belt for receiving multiple rows of containers. In the present instance the conveyors extend at right angles to each other. The manner in which the swinging movement of arms 33 and beam 34 is achieved will now be described.

Figure 3:
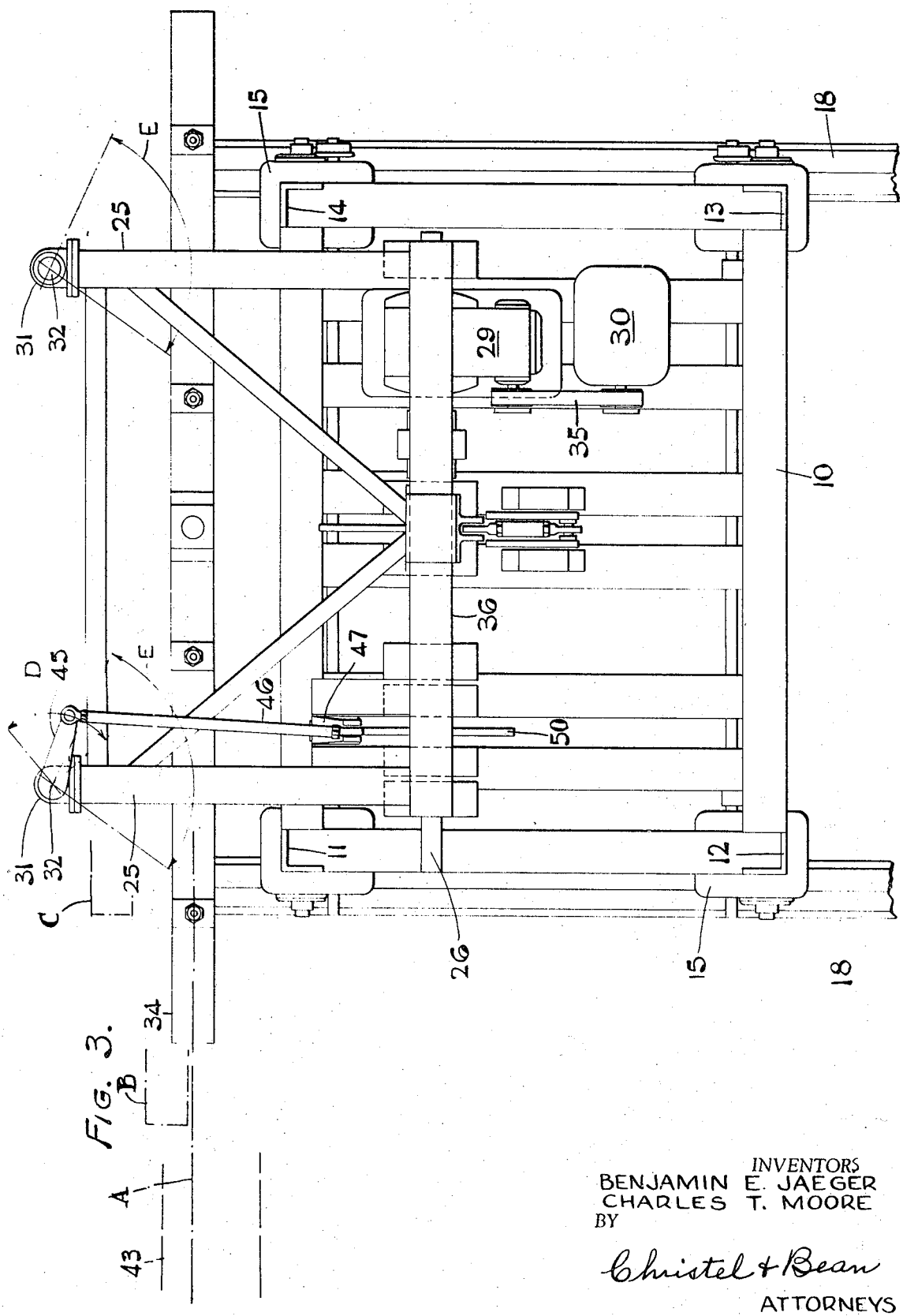
FIG. 3 is a top plan view of the apparatus of FIGS. 1 and 2.

Referring to FIG. 3, the left-hand rock shaft 32, to the lower end of which arm 33 is fixed, has an arm 45 fixed to its upper end and a link 46 is pivoted at its opposite ends to the outer end of arm 45 and the upper end of a cam lever 47 best shown in FIG. 1. Lever 47 is pivoted to the machine framework at 48 framework at 48 and has a cam follower 49 at its lower end which engages the periphery of a cam 50 on shaft 26.

Figure 4:
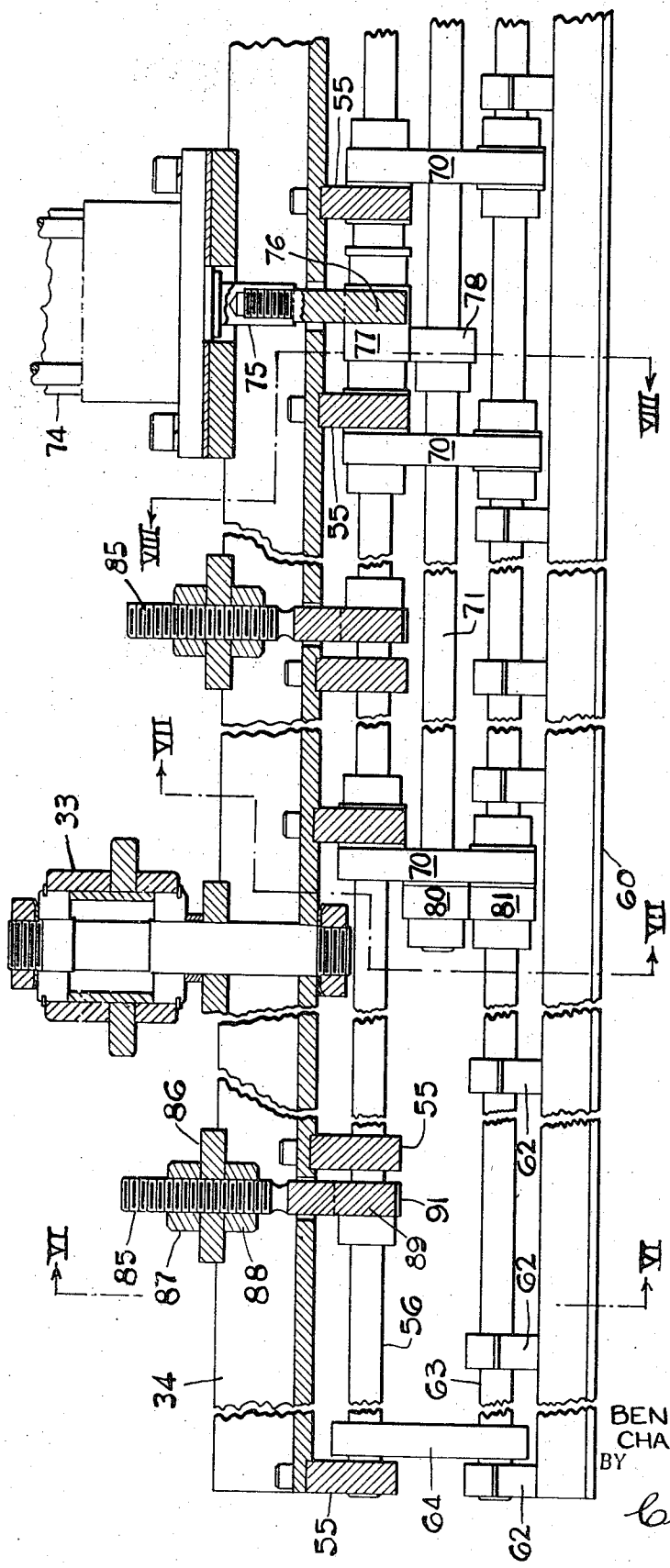
FIG. 4 is a longitudinal vertical cross-sectional view through the pickup mechanism.

Reference will now be had to the mechanism for picking up bottles from a feed conveyor and for moving them to and depositing them on a discharge conveyor or other surface. The mechanism for grasping and releasing a row of bottles is supported by the beam designated 34 in FIGS. 1, 2 and 3 and this mechanism is shown in detail in FIGS. 4 through 8, to which references will now be had. FIG. 4 is a vertical longitudinal cross-sectional view of beam 34 and the mechanism supported thereby, showing the left-hand end of beam 34 as viewed in FIG. 4, through the central portion of the beam, the right-hand end of the mechanism being a duplication of such left-hand end.

Figure 5:
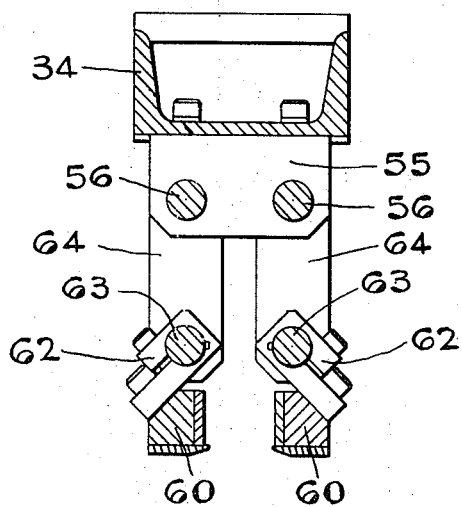
FIG. 5 is an end elevational view of the pickup mechanism of FIG. 4.

Bearing blocks 55 at the opposite ends of beam 34 and at several points along the beam rotatably support the opposite ends of a pair of parallel horizontally spaced rock shafts 56. Referring particularly to FIG. 5, a pair of parallel pickup bars 60 are attached to a on longitudinal series of brackets 62 which are rotatably mounted on a pair of rock shafts 63 which in turn are rotatably journaled in the lower ends of arms 64. The upper ends of arms 64 are fixed to parallel shafts 56.

Figure 7:
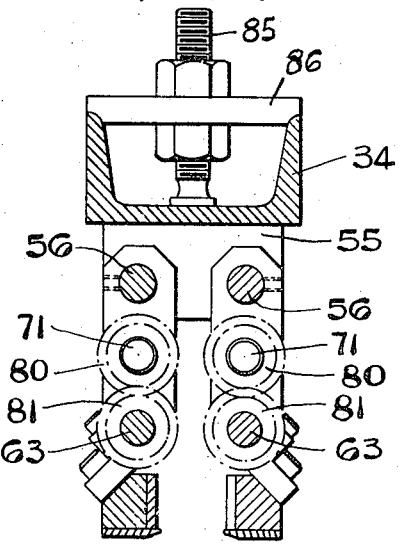
FIG. 7 is a cross-sectional view on the line VII–VII of FIG. 4.
Figure 6:
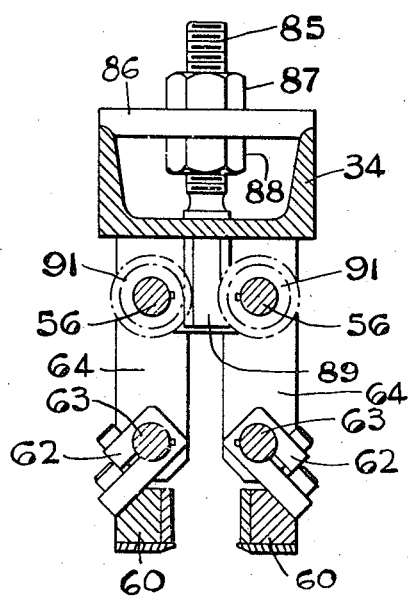
FIG. 6 is a cross-sectional view on the line VI–VI of FIG. 4.

Referring particularly to FIGS. 4 and 7, four intermediate arms 70 are likewise fixed to and depend from rock shafts 56 and at their lower ends also have rotatable engagement with shafts 63. Between the upper and lower shafts 56 and 63 a further pair of shafts 71 pass rotatably through the several arms 70. Arms 70 and shafts 71 are provided for moving clamp bars 60 toward and away from each other for gripping and releasing the upper ends of rows of bottles or similar articles, as will presently appear.

Figure 8:
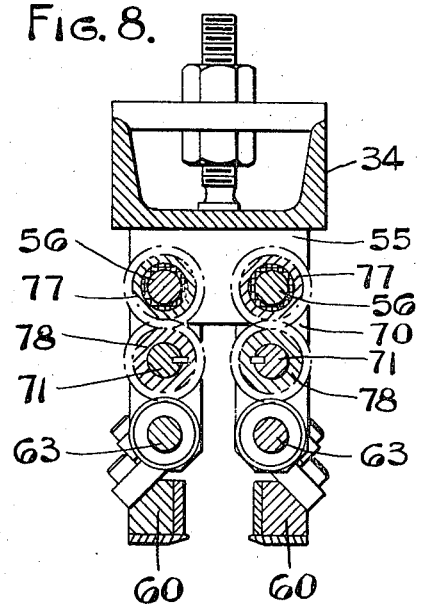
FIG. 8 s is a cross-sectional view on the line VIII–VIII of FIG. 4.

An air cylinder 74 is mounted on beam 34 midway thereof and its piston rod 75 projects downwardly as shown in FIG. 4 and terminated terminates in a rack member 76 which extends between and has driving engagement with a pair of pinions 77 which are mounted on upper shafts 56 for free rotation and mesh with pinions 78 which are fixed to intermediate shafts 71, all as shown in FIG. 8. Pinions 80 shown in FIGS. 4 and 7 are fixed to the outer ends of intermediate shafts 71 and mesh with pinions 81 which are fixed to lower shafts 63.

Upper shafts 56 are normally fixed against rotation during gripping and releasing movements of bars 60 and accordingly the arms 64 and 70 are likewise normally fixed. This condition is due to the operation of the following adjusting means. A plurality of studs 85 pass through plates 86 fixed to beam 34 and are held in vertically adjusted position by nuts 87 and 88. Studs 85 have rack portions 89 at their lower ends which mesh with pinions 91 which are fixed to shafts 56, all as clearly shown in FIG. 6. From this it will be seen that the rack and pinion connection 89, 91 normally prevents rotative movement of shafts 56 and rams 64 and 70.

Accordingly, the spacing of lower shafts 63 is normally fixed, subject to adjustment for varying the space between bars 60 to adapt the same for gripping bottle necks of various diameters. When the piston rod 75 of cylinder 74 descends with its rack portion 76 passing between and meshing with the pair of pinions 77 which rotate freely on shafts 56, the pinions 77 rotate intermediate shafts 71 through pinions 78 and this rotates shafts 63 through the pinion connection 80, 81 to swing the clamp bars 60 apart and, upon subsequent upward movement of piston rod 75, toward each other.

The arrangement for adjusting the spacing between gripping bars 60 is such as to retain parallelism or other desired relationship between the r gripping faces of bars 60 in various positions of adjustment. When nuts 87 and 88 are loosened to vary the spacing of bars 60, pinions 77 are held at rest by rack 76 so that pinions 78 rotate against pinions 77 and, through pinions 80, rotate the pinions 81 and rock shafts 63 in an opposite direction to the direction of adjustment of shafts 56 and arms 64 and 70. This maintains parallelism of the faces of the gripping bars 60 as they are adjusted toward or away from each other. After proper spacing of bars 60 is established nuts 87 and 88 are again tightened to retain this adjustment.

OPERATION

In the present embodiment, referring to the plan view, FIG. 3, the bottles come to the transfer mechanism in a single row on conveyor 43 and are to be transferred to a relatively wide lehr belt conveyor designated 44 in FIG. 1. The conveyor belts 43 and 44 extend at right angles to each other and, in the present instance, although not necessarily, have their upper surface in substantially a common plane. The center line of the bottles on conveyor 43 is indicated by the line A in FIG. 3 and beam 34 is shown at an intermediate point in its counter-clockwise arc of movement, which represents the point at which the bars 60 close to engage a row of bottles on conveyor 43.

Since it is fundamental in the present invention that the pickup bar in the pickup position illustrated in full lines in FIG. 3 be travelling at substantially the same speed as conveyor 43, a preliminary acceleration period in the arc of travel is provided. In FIG. 3 the letter B shows beam 34 in its left-hand limit of arcuate movement and the letter C indicates beam 34 in its right-hand limit of arcuate movement. The corresponding arcs of movement of the arm 45 and the rock arms 33 which connect with beam 34 are designated by the letters D and E, respectively.

At the release point which occurs as beam 34 approaches or reaches its limit position C, the component of movement of beam 34 in the direction of travel of lehr belt 44 is substantially equal to the speed of movement of the lehr belt. However, due to the relatively slow travel of the lehr belt, this synchronization is not as critical as in the pickup operation in the present instance. In fact, at the release point the bottles have a minor component of transverse movement with respect to the direction of the lehr belt but this is inconsiderable since the beam is practically stopped at the discharge point, in the present example.

The cam 50 is contoured to produce the desired synchronized movements of beam 34 at the pickup and discharge points. It is to be understood that the cam contour may be varied to produce any required synchronization at the pickup and discharge points. If desired, the amplitudes of arms 33 and 45 may be varied to discharge the bottles directly in the direction of movement of the discharge belt but this is not essential in the present instance.

It is to be understood that cam 41 raises and lowers brace brackets 25 on rock shaft 26 in synchronism with the pickup and release operations of the mechanism supported by beam 34. Thus cam 41 is contoured to lower bracket 25 immediately prior to the pickup position illustrated in full lines in FIG. 3, raise the bracket 25 immediately upon closing of the bars 60, again lower the bracket 25 just before the discharge position C is reached, and again raise the bracket 25 after the bars 60 separate to discharge the bottles on lehr belt 44.

While the belts 43 and 44 are at the same level in the illustrated example, this need not be the case and cam 41 may be contoured so that the lowered position of bracket 25 is at a different elevation at the discharge point than at the pickup point.

In the present instance the two arms 33 are of equal length and the beam 34 accordingly maintains parallelism. However, if the feed and discharge belts are not at right angles the arms may be of unequal lengths to discharge the bottles along a line which is oblique with respect to the pickup line.

While a single specific embodiment of the principles of the present invention is illustrated in the accompanying drawings and described in detail in the following specification, it is to be understood that such embodiment is by way of example only and that various mechanical modifications may be made without departing from the spirit of the invention.

We claim:

1. Apparatus for simultaneously transferring a row of articles between two positions, one wherein the articles are disposed in a longitudinal row on a conveyor and the other wherein the articles are disposed in a transverse row on a conveyor moving at a slower speed, said apparatus comprising a elongated parallel bars movable toward each other to simultaneously grip such row of articles and movable away from each other to subsequently release said row, spaced pivotal arms mounting said elongated gripping bars for swinging movement in a generally horizontal plane and moving through a position of tangency with respect to the path of movement of the row of articles along said first-mentioned conveyor, variable drive means for moving said arms at the speed of said first-mentioned conveyor at the time of said tangency and for moving a said arms at a slower speed when said gripping bars are above said second-mentioned conveyor, and means for moving said bars toward and away from each other in timed relation with respect to movement of said arms for gripping a row of articles at one of said conveyors and releasing the same at the other of said conveyors.

2. Apparatus according to claim 1 wherein said conveyors extend substantially at right angles to each other and wherein said arms move said elongated gripping bars in parallelogram fashion.

3. Apparatus according to claim 1 including means for raising and lowering said gripping bars in timed relation with gripping and releasing movements thereof to lower said bars immediately prior to gripping and releasing movements and raising said bars immediately subsequent to gripping and releasing movements.

4. Apparatus according to claim 1 wherein said bars move toward each other to grip a row of articles on said first-mentioned conveyor and move away from each other to release said row of articles in transverse position on said second-mentioned conveyor.

5. Apparatus according to claim 4 including means for raising means for raising and lowering said gripping bars in timed relation with gripping and releasing movements thereof to lower said bars immediately prior to gripping and releasing movements and raising said bars immediately subsequent to gripping and releasing movements.